United States Patent
Jerger

(10) Patent No.: US 10,400,888 B2
(45) Date of Patent: Sep. 3, 2019

(54) CONTROL OF A MULTI-SPEED VEHICLE TRANSMISSION

(71) Applicant: JAGUAR LAND ROVER LIMITED, Warwickshire (GB)

(72) Inventor: Rob Jerger, Coventry (GB)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 32 days.

(21) Appl. No.: 15/318,693

(22) PCT Filed: Jun. 23, 2015

(86) PCT No.: PCT/EP2015/064098
§ 371 (c)(1),
(2) Date: Dec. 14, 2016

(87) PCT Pub. No.: WO2015/197609
PCT Pub. Date: Dec. 30, 2015

(65) Prior Publication Data
US 2017/0138466 A1      May 18, 2017

(30) Foreign Application Priority Data

Jun. 23, 2014   (GB) .................................. 1411123.1

(51) Int. Cl.
*B60R 11/04*     (2006.01)
*F16H 61/02*     (2006.01)
(Continued)

(52) U.S. Cl.
CPC .......... *F16H 61/0213* (2013.01); *B60R 11/04* (2013.01); *B60W 30/182* (2013.01);
(Continued)

(58) Field of Classification Search
CPC .............. F16H 60/0213; F16H 59/66; F16H 2059/663; F16H 2061/0227; B60R 11/04;
(Continued)

(56) References Cited

U.S. PATENT DOCUMENTS 5,832,400 A * 11/1998 Takahashi .............. B60K 31/00
701/53
2009/0018732 A1   1/2009 Choby et al.
(Continued)

FOREIGN PATENT DOCUMENTS

DE            19856732 A1    6/2000
DE     10 2010 028669 A1   11/2011
(Continued)

OTHER PUBLICATIONS

Combined Search and Examination Report under Sections 17 and 18(3) for Application No. GB1411123.1 dated Jan. 15, 2015.
(Continued)

*Primary Examiner* — David J Hlavka
(74) *Attorney, Agent, or Firm* — Carlson, Gaskey & Olds

(57) ABSTRACT

A vehicle (10) has a camera recognition system to detect and interpret a road sign (14) indicative of a gradient. A gradient related shift map of an automatic vehicle transmission is pre-selected upon recognition of the road sign, and implemented upon detection that the gradient has commenced. The invention provides for rapid and consistent implementation of a suitable shift map on a gradient.

20 Claims, 1 Drawing Sheet

(51) Int. Cl.
*B60W 40/076* (2012.01)
*F16H 59/66* (2006.01)
*B60W 30/182* (2012.01)

(52) U.S. Cl.
CPC .......... *B60W 40/076* (2013.01); *F16H 59/66* (2013.01); *B60W 2420/42* (2013.01); *B60W 2510/0657* (2013.01); *B60W 2530/10* (2013.01); *B60W 2550/12* (2013.01); *B60W 2550/13* (2013.01); *B60W 2550/142* (2013.01); *B60W 2550/22* (2013.01); *B60Y 2400/3015* (2013.01); *F16H 2059/663* (2013.01); *F16H 2061/0227* (2013.01)

(58) Field of Classification Search
CPC .......... B60W 40/076; B60W 2420/42; B60W 2550/22; B60W 2550/13; B60W 2550/12; B60W 2530/10; B60W 2510/0657; B60W 2550/142; B60Y 2400/3015
See application file for complete search history.

(56) References Cited

U.S. PATENT DOCUMENTS

| | | |
|---|---|---|
| 2009/0103781 A1 | 4/2009 | Fleury et al. |
| 2017/0045137 A1* | 2/2017 | Dufford .............. F16H 61/0213 |
| 2017/0122430 A1* | 5/2017 | Jerger ................. F16H 61/0213 |

FOREIGN PATENT DOCUMENTS

| | | |
|---|---|---|
| EP | 1334863 A2 | 8/2003 |
| WO | 2011/138097 A1 | 11/2011 |

OTHER PUBLICATIONS

International Search Report and Written Opinion of the International Searching Authority for International application No. PCT/EP2015/064098 dated Sep. 30, 2015.

\* cited by examiner

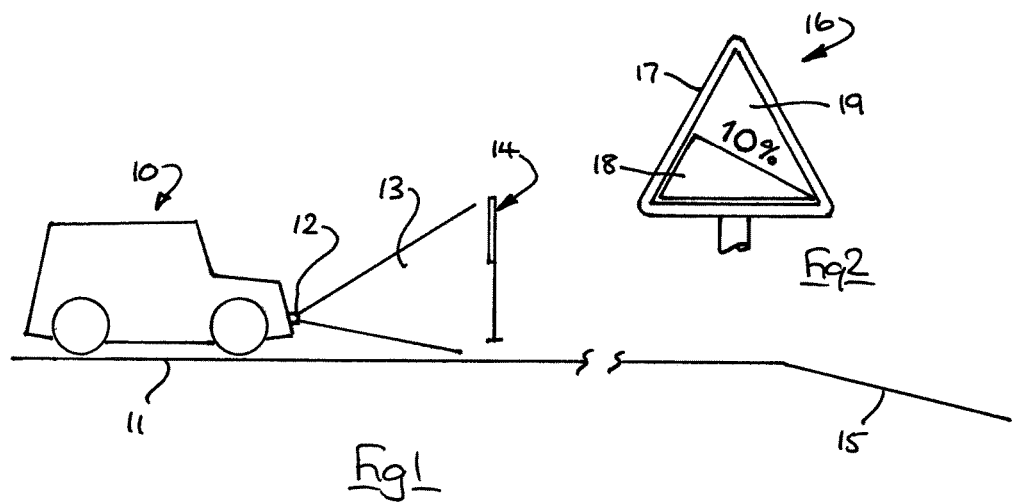
Fig 1
Fig 2
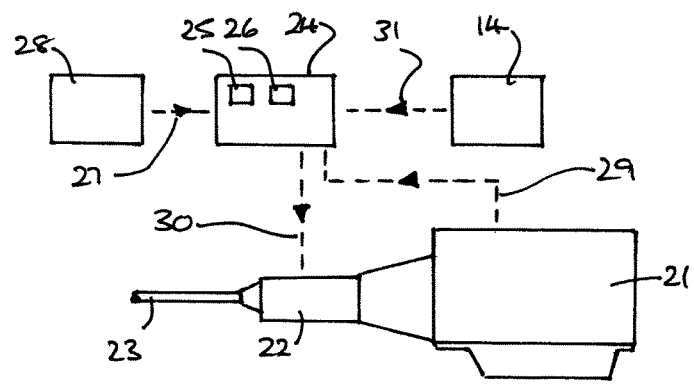
Fig 3

CONTROL OF A MULTI-SPEED VEHICLE TRANSMISSION

TECHNICAL FIELD

This invention relates to multi-speed transmissions of motor vehicles, and methods and systems for effecting an automatic change of speed ratio according to road gradient. Aspects of the invention relate to a method of and system for selecting one of a plurality of vehicle transmission shift points by reference to road gradient, a transmission controller, a computer program, and a vehicle.

BACKGROUND TO THE INVENTION

Automatic control of multi-speed vehicle transmissions is well-known. Speed ratio changes are effected automatically, usually by reference to vehicle speed and accelerator pedal position. Thus typically an upshift will be delayed when accelerator pedal position is indicative of a demand for rapid acceleration, allowing engine speed to be greater at the shift point than for the case of a demand for lesser acceleration.

Electronic control techniques permit automatic speed ratio change to be initiated according to an electronic shift map whereby road speed, accelerator pedal position and other factors are provided as inputs to an electronic processor, and algorithms and/or look-up tables allow the instant shift point to be determined.

Many control systems for automatic transmissions include gradient recognition, whereby the shift point may vary according to the instant road gradient. Thus when travelling uphill, a lower speed ratio may remain engaged due to the raising of a shift point with respect to engine speed. Conversely a shift point may be at a reduced engine speed when on a downhill gradient. In practice a plurality of shift maps corresponding to step changes of gradient may be provided. These arrangements may be used to improve fuel efficiency of a vehicle engine as compared with a shift map which is insensitive to gradient, and may also better meet driver expectations.

One method of a gradient determination compares instant engine torque against acceleration (rate of change of speed), and provides an algorithm to calculate gradient by reference to deviation from base data obtained from running a vehicle on a level road in benign conditions. Other factors which may be taken into account include vehicle mass, altitude and ambient temperature.

If the vehicle accelerates faster than indicated by base data, it may be assumed that the vehicle is on a down gradient, and if slower is on an up gradient. Likewise a level gradient can be detected after an up or down gradient has ceased. Suitable thresholds are chosen appropriate to pre-determined gradient steps. This measure may also be used to compensate for changes in acceleration due to high vehicle mass or due to a towed trailer.

In place of engine torque, the comparison may use tractive effort or some other measure which relates to the motive force of the vehicle.

One characteristic of sensing road gradient by comparing engine torque and rate of change of speed is that adoption of an alternative shift map requires that sufficient distance be travelled on the gradient for a reliable determination to be made; thus adoption of an alternative shift map may not occur until the gradient has been substantially entered.

A further characteristic is that the start and end of a gradient is generally gradual. Accordingly the comparison of engine torque and rate of change of speed may not be assumed to give a reliable indication of gradient until the gradient has become consistent. In some circumstances the transmission may be caused to select sequential shift maps as the gradient progressively changes.

The effect of these characteristics is that the most suitable shift map may not be adopted as early as is desirable, and/or the vehicle is perceived to exhibit to the driver a variability associated with different shift points, which may be assumed to indicate a fault when no fault is present.

An apparatus and method of overcoming these effects would be desirable.

WO-2011/138097 discloses a recognition system of road signs whereby an imminent change of gradient is identified, and in consequence the shift points of an automatic vehicle transmission are changed. Whilst this system may be useful, it relies upon consistent position of road signs with respect to the commencement of the gradient, for otherwise a change of shift map may occur too early or too late. Such a system does not address cessation of a gradient, which would also require to be signed.

SUMMARY OF THE INVENTION

According to a first aspect of the invention there is provided a method of selecting one of a plurality of vehicle transmission shift points by reference to road gradient, the method comprising:
  pre-selecting an alternative transmission shift point appropriate to a gradient indicated on a road sign recognized by means of a forward facing camera device;
  detecting a parameter indicative of a change of road gradient; and upon detection
  immediately implementing said pre-selected alternative transmission shift point.

The transmission shift point of the transmission is typically one of a plurality of shift points defined by a plurality of shift maps provided in a read only memory of a transmission controller, and applied by a processor according to relevant inputs of the processor. Transmission controllers of this kind are well-known, and need not be further described here.

The influence of the gradient may be detected in any suitable manner, for example by determining that the vehicle is on a gradient exceeding a predetermined gradient threshold. In another example a down gradient may be recognized by application of the vehicle brakes, for example by providing the brake light signal to the processor as a digital input.

The effect of the invention is to pre-select a shift map appropriate to the signed gradient, but to delay implementation thereof until the gradient has been reached. This both overcomes the disadvantage of immediate implementation upon recognition of a sign, and ensures rapid implementation without waiting for a sufficient accumulation of gradient data to give a reliable change of shift point or shift map.

The invention is applicable to any up or down gradient which is signed in advance, and has particular applicability for those relatively severe gradients which are routinely signed by highway authorities.

In one embodiment the influence of gradient is detected by comparison of a measure of real-time engine torque (or vehicle tractive effort) and rate of change of speed with base data as previously described. Thus an up gradient may be detected by a relative slowing of the vehicle in circumstances where base data indicates that the real-time engine torque would produce a different (higher) rate of change of speed on a level road. Likewise a down gradient may be indicated by a relative acceleration of the vehicle as compared with the expectation of base data.

The method may comprise providing the forward facing camera device adapted to recognize a road sign indicative of a change of road gradient.

According to a second aspect of the invention there is provided a system for selecting one of a plurality of shift points of a vehicle transmission by reference to a road gradient, said system comprising a camera device for forward facing mounting on a vehicle, said camera device being adapted to recognize a road sign indicative of a change of road gradient; a transmission controller in communication with said camera device, for determining a shift point between speed ratios of the vehicle transmission; and a detection device in communication with said transmission controller for detecting a change of road gradient; said transmission controller being adapted to pre-select an alternative shift point upon recognition of said road sign, and to immediately implement said alternative shift point upon detection of said change of road gradient.

The shift point may be defined in a shift map contained in a read only memory of the transmission controller, and the transmission controller may comprise a computer processor having inputs indicative of for example engine speed of the vehicle, road speed of the vehicle and accelerator pedal position of the vehicle. The transmission controller may have an output applying a selected shift map to the vehicle transmission in order to define the shift points thereof.

Any suitable camera device may be used, typically a digital camera operable in the visible wavelengths of light. Any suitable recognition system may be used to recognize road signs, typically recognition software applied by a computer processor associated with the camera device or of the vehicle. The recognition system may recognize both shapes and numerical values from a road sign.

The influence of gradient on the vehicle may be sensed or detected in any suitable manner, directly or indirectly. A typical direct method may rely on a mechanical or electrical level sensing device of a vehicle, the device having an output indicative of vehicle attitude in the fore and aft direction with respect to horizontal. The level sensing device may provide a digital input for a transmission controller indicative of attitude exceeding a threshold angle, for example, 5°.

An indirect method may rely upon a computer processor adapted to compare a measure of real-time tractive effort and rate of change of vehicle speed with base data, as previously described. The processor may provide a digital input for a transmission controller indicative of a gradient exceeding a threshold of, for example, 5%. Another indirect method may rely upon detection of vehicle braking, using the vehicle brake light signal as a digital input for the transmission controller.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. As used herein, the term "vehicle control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

According to a further aspect of the invention there is provided a computer program which, when run on a processor, causes one or more of the methods described herein to be performed.

According to a further aspect of the invention there is provided a non-transitory computer readable medium storing a computer program comprising computer program instructions, that, when performed by one or more processors, causes one or more of the methods described herein to be performed.

According to a further aspect of the invention there is provided an apparatus comprising: at least one memory storing computer program instructions; and at least one processor configured to execute the computer program instructions to cause the apparatus at least to perform one or more of the methods described herein.

According to a further aspect of the invention there is provided a transmission controller adapted to carry out one or more of the methods described herein.

According to embodiments of the invention there may be provided a method of selecting one of a plurality of vehicle transmission shift points by reference to road gradient, the method comprising providing a forward facing camera device on a vehicle said device being adapted to recognize a road sign indicative of a change of road gradient; pre-selecting an alternative transmission shift point appropriate to the indicated gradient; detecting on the vehicle the influence of a change of road gradient; and upon detection immediately implementing said pre-selected transmission shift point.

Within the scope of this application it is expressly intended that the various aspects, embodiments, examples and alternatives set out in the preceding paragraphs, in the claims and/or in the following description and drawings, and in particular the individual features thereof may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates schematically the invention, by reference to a vehicle on a level road with an imminent down gradient.

FIG. 2 illustrates a conventional road sign indicating a down gradient.

FIG. 3 illustrates schematically a system of controlling a transmission according to the invention.

DESCRIPTION OF AN EMBODIMENT OF THE INVENTION

With reference to the drawings, a vehicle 10 having an automatic multi-speed transmission is illustrated on a level road 11. The vehicle has a forward facing camera 12 having a field of view 13. A road sign 14 at the side of the road 11 indicates a down gradient 15 at an indeterminate distance from the sign 14.

The sign 14 may be of any suitable standard kind, and a typical sign 16 indicative of a down gradient of 10% is shown in enlarged form in FIG. 2. The sign is triangular and has a red border 17 within which a black triangle 18 is provided on a white background 19; the average or steepest gradient is given in black numerals, as illustrated.

The forward facing camera has an output which is provided to a recognition system capable of identifying the road sign and interpreting the information thereon. Such image recognition systems are well-known, and need not be further described here. These systems may be capable of identifying and interpreting many different standard kinds of signs, so that official gradient signs of a different format to that illustrated in FIG. 2 may also be readily recognized.

An embodiment of a system according to the invention is illustrated schematically in FIG. 3.

A vehicle engine 21 has a torque converter automatic transmission 22 having an output drive shaft 23 for driving the vehicle wheels. The shift map of the transmission, indicating the shift points for changing speed ratio, is provided by a transmission controller 24, typically comprising a computer processor 25 having a plurality of shift maps defined by algorithm or contained in a read only memory 26. The invention may be applied to other kinds of automatic vehicle transmission having a plurality of individually selectable speed ratios, and a controller for determining the shift point between speed ratios.

In order to determine the appropriate shift map, the controller 24 is provided with a road speed input 27 from a suitable road speed sensor 28, and an input 29 indicative of accelerator pedal position; an engine speed input may also be provided. Other inputs may be provided to influence the shift map selected by the controller 24, including for example ambient temperature and altitude. As previously explained, the selected shift map may be dependent upon an assessment of engine output torque as compared with rate of change of speed, in order to indicate the road gradient. Engine output torque may be indicated by reference to a look-up table by reference to accelerator pedal position and engine speed (which may for example be determined from road speed and overall transmission ratio).

Transmission speed ratio shifting is determined by an output signal 30 from the controller 24. An output signal 31 from the camera 14 is analyzed by suitable image recognition software, which may be provided in the controller 24 or elsewhere in the vehicle, to influence shift map selection.

In particular, if a gradient sign is recognized, a shift map appropriate to the gradient is pre-selected by the controller 24, but not implemented. The transmission is in a condition to immediately adopt the pre-selected shift map upon detection of a trigger.

This trigger may be provided by one of several further inputs to the controller 24. In one embodiment the trigger is a detection that engine torque no longer gives the rate of change of speed appropriate to a level road. In this embodiment the pre-selected shift map is immediately implemented without waiting for a determination of gradient, and accordingly the transmission has shift points appropriate to the signed gradient earlier than provided for in the prior art.

An alternative trigger may be provided by an input to the processor 24 indicative of vehicle braking, for example an electrical signal activating the vehicle brake lights. Thus braking in anticipation of a down gradient, or at the commencement of a down gradient will cause the pre-selected shift map to be implemented.

In both of these alternatives the trigger requires breach of a threshold in order to ensure reliable and consistent implementation of a gradient related shift map. For example relative acceleration of a vehicle on a down grade may be required to meet thresholds of time, distance or rate, and braking may be required to meet a threshold of time.

Upon cessation of the gradient, a regular shift map may be re-imposed by the controller 24, according to a conventional real time assessment of engine torque and rate of change of vehicle speed.

Although described and illustrated by reference to a down gradient 15, the same technique may be used to pre-select a shift map appropriate to an up gradient.

In a further aspect the controller may pre-select a regular shift map after imposition of a gradient related shift map, and the regular shift map may be re-imposed immediately upon detection of a signal indicative of a level road. In particular the regular shift map may be re-imposed without waiting for a determination of gradient of a level road, but as soon as a comparison of engine torque and rate of change of road speed indicate a level road.

The invention may be implemented in conjunction with a global positioning system (GPS) or the like whereby the instant road position of the vehicle is related to a topographical map in order to increase confidence of road sign recognition. For example recognition of a signed gradient may be countermanded or ignored if the vehicle is travelling in a flat geographical region. Alternatively if image recognition software indicates a recognition confidence below a threshold, the processor 24 may seek to confirm or deny gradient recognition based upon GPS or other map data.

Changes and modifications to the invention are envisaged within the scope of the appended claims.

Aspects of the invention will be apparent from the numbered paragraphs that follow:

1. A method of selecting one of a plurality of vehicle transmission shift points by reference to road gradient, the method comprising:
   providing a forward facing camera device adapted to recognize a road sign indicative of a change of road gradient;
   pre-selecting an alternative transmission shift point appropriate to the indicated gradient;
   detecting a parameter indicative of a change of road gradient; and upon detection immediately implementing said pre-selected alternative transmission shift point.

2. The method of aspect 1 wherein a plurality of shift points including said alternative shift point are pre-selected, one pre-selected shift point being provided for each speed ratio shift of the transmission.

3. The method of aspect 1 and further comprising:
pre-selecting a standard transmission shift point appropriate to a level road;
detecting a parameter indicative of a level road; and
immediately implementing said pre-selected standard transmission shift point.

4. The method of aspect 3 wherein a plurality of shift points including said standard shift point are pre-selected, one pre-selected shift point being provided for each speed ratio shift of the transmission.

5. The method of aspect 4 wherein said plurality of shift points are defined in two or more shift maps.

6. The method of aspect 5, and comprising:
recognizing alpha-numeric information on said road sign, and pre-selecting one of a plurality of shift maps according to a value of said alpha-numeric information.

7. The method of aspect 6 wherein said alpha-numeric information comprises a numerical indication of gradient.

8. The method of aspect 1 wherein the parameter indicative of a change of road gradient is one of:
a real-time comparison of tractive effort with rate of change of road speed; and
braking of the vehicle, and
attitude of the vehicle.

9. A system for selecting one of a plurality of shift points of a vehicle transmission by reference to a road gradient, said system comprising:
a camera device for forward facing mounting on a vehicle, said camera device being adapted to recognize a road sign indicative of a change of road gradient;
a transmission controller in communication with said camera device, for determining a shift point between speed ratios of the vehicle transmission; and
a detection device in communication with said transmission controller for detecting a change of road gradient;
said transmission controller being adapted to pre-select an alternative shift point upon recognition of said road sign, and to immediately implement said alternative shift point upon detection of said change of road gradient.

10. The system of aspect 9 wherein said camera has a digital output and said system comprises image recognition software for recognizing said road sign.

11. The system of aspect 10 wherein said image recognition software is adapted to recognize alpha-numeric information of said road sign.

12. The system of aspect 11 wherein said transmission controller is adapted to pre-select one of a plurality of alternative shift points according to said alpha-numeric information.

13. The system of aspect 9 wherein said transmission controller comprises an electronic processor incorporating said image recognition software.

14. The system according to aspect 9 wherein said camera device comprises an electronic processor incorporating said image recognition software.

15. The system according to aspect 9 wherein said transmission controller includes an electronic processor comprising said detection device.

16. The system of aspect 9 is incorporated within a vehicle having an automatic transmission.

17. A vehicle having an automatic transmission, a shift point of said transmission being selected in advance of a change of road gradient, according to the method of aspect 1.

The invention claimed is:

1. A method of selecting one of a plurality of vehicle transmission shift points, the method comprising:
pre-selecting an alternative transmission shift point appropriate to a gradient indicated on a road sign recognized from an indication from a forward facing camera device;
detecting a parameter indicative of a change of road gradient; and upon detection immediately implementing said pre-selected alternative transmission shift point.

2. The method according to claim 1, wherein
there are a plurality of speed ratio shifts;
pre-selecting said alternative transmission shift point further comprises pre-selecting a plurality of alternative transmission shift points; and
the method comprises providing one of the pre-selected alternative transmission shift points for each of the plurality of speed ratio shifts.

3. The method according to claim 1, comprising:
pre-selecting a standard transmission shift point appropriate to a level road;
detecting a parameter indicative of a level road; and
immediately implementing said pre-selected standard transmission shift point.

4. The method according to claim 3, wherein
there are a plurality of speed ratio shifts;
pre-selecting the standard transmission shift point further comprises pre-selecting a plurality of standard transmission shift points; and
the method comprises providing one of the plurality of pre-selected standard transmission shift points for each of the plurality of speed ratio shifts.

5. The method according to claim 4, comprising storing said plurality of vehicle transmission shift points in a plurality of shift maps in a memory.

6. The method according to claim 5, comprising:
recognizing alpha-numeric information on said road sign, and pre-selecting one of the plurality of shift maps according to a value of said alpha-numeric information.

7. The method according to claim 6, wherein said alpha-numeric information comprises a numerical indication of gradient.

8. The method according to claim 1, wherein the parameter indicative of the change of road gradient is one of:
a real-time comparison of tractive effort with rate of change of road speed,
braking of the vehicle, and
attitude of the vehicle.

9. The method according to claim 1, comprising providing the forward facing camera device adapted to recognize the road sign indicative of the change of road gradient.

10. A transmission controller configured to perform the method of claim 1.

11. A computer program stored on a non-transitory medium which, when run on a processor, causes the processor to perform the method of claim 1.

12. A vehicle comprising an automatic transmission configured to be controlled using the method of claim 1 and wherein the alternative transmission shift point of said automatic transmission is selected in advance of the change of road gradient.

13. A system for selecting one of a plurality of transmission shift points of a vehicle transmission, said system comprising:
- a camera device configured for forward facing mounting on a vehicle, said camera device being adapted to recognize a road sign indicative of a change of road gradient;
- a transmission controller in communication with said camera device, for determining a transmission shift point between speed ratios of the vehicle transmission, wherein the transmission shift point is one of the plurality of transmission shift points; and
- a detection device in communication with said transmission controller for detecting the change of road gradient;
- said transmission controller being configured to pre-select an alternative transmission shift point upon recognition of said road sign, and to immediately implement said alternative transmission shift point upon detection of said change of road gradient.

14. The system according to claim 13, wherein said camera device has a digital output and said system comprises image recognition software for recognizing said road sign.

15. The system according to claim 14, wherein said image recognition software is configured to recognize alpha-numeric information of said road sign.

16. The system according to claim 15, wherein said transmission controller is configured to pre-select the alternative transmission shift point from a plurality of alternative transmission shift points according to said alpha-numeric information.

17. The system according to claim 14, wherein said transmission controller comprises an electronic processor incorporating said image recognition software.

18. The system according to claim 14, wherein said camera device comprises an electronic processor incorporating said image recognition software.

19. The system according to claim 13, wherein said transmission controller includes an electronic processor comprising said detection device.

20. A vehicle comprising the system of claim 13.

* * * * *